United States Patent Office 3,275,463
Patented Sept. 27, 1966

3,275,463
COATING COMPOSITIONS COMPRISING SUBSTITUTED GUANIDINE DRYING ACCELERATORS
Robert A. Braun, Newark, Del., assignor to E. I. du Pont de Nemours and Company, Wilmington, Del., a corporation of Delaware
No Drawing. Filed Sept. 18, 1962, Ser. No. 224,506
5 Claims. (Cl. 106—287)

This invention relates to a new class of substituted guanidine compounds. It in particular relates to $N^2$-carbamoyl-$N^1,N^1,N^3,N^3$-tetrasubstituted guanidines and their analogues, the N-carbamoyl-di-1,1'-(disubstituted amino) methyleneimines. If further relates to a process for making these compounds by reacting isocyanates with tetrasubstituted guanidines.

The compounds of this invention are active as accelerators for the air drying (oxygen conversion) of siccative oils and vehicles. They are especially useful in combination with siccative metal driers, such as cobalt compounds, to accelerate the drying of 2-vinyl cyclic acetal coating compositions. This is in unexpected contract to the behavior of analogous $N^2$-carbamoyl-$N^1,N^3$-(mono-, di- and trisubstituted) guanidines which are not accelerators. The compounds of this invention are further valuable as accelerators because they avoid the handling and storage problems of the simpler substituted guanidines in their being non-hygroscopic, free from absorbance of carbon dioxide and in being non-caustic, weak bases. The majority of these compounds are either liquids or are readily soluble in common solvents or in siccative coating compositions, facilitating their dispersal and use therein.

The adducts of guanidines with polyisocyanates within this invention are further valuable as a means for incorporating the guanidine structure into polymers both to provide sites for dye molecules in films, fibers and coatings as well as to promote polymer adhesion to metals, wood and other surfaces. The guanidine structure in polymer further is valuable as a means of providing water sensitive or solubilizing groupings therein.

The compounds of this invention can be represented as having the following structure:

 (1)

or

 (2)

in which:
x is an integer from 1 to 6;
y is an integer from 0 to 6—x;
R is a monovalent organic radical having 1 to 12 carbon atoms;
$R^1$ is a polyvalent organic radical of valence equal to x+y;
B is hydrogen or an isocyanate radical;
G is an ($N^1,N^1,N^3,N^3$-tetrasubstituted guanidine-$N^2$) carboxamido radical having the following structure:

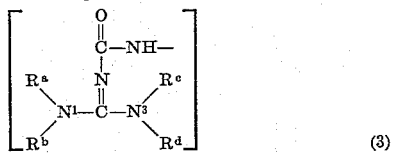 (3)

wherein:
$R^a$, $R^b$, $R^c$ and $R^d$ can be monovalent hydrocarbyl and substituted hydrocarbyl radicals or $R^a$ can be combined with $R^b$, and $R^c$ can be combined with $R^d$ in the form of divalent alkylene, alkenylene or oxyalkylene radicals.

These compounds are prepared by the general addition reaction of isocyanates to $N^1,N^1,N^3,N^3$-tetrasubstituted guanidines and to the related 1,1-di(disubstituted amino) methyleneimines. The reaction proceeds best in inert anhydrous solvent by gently refluxing the reactants, followed by recovery of the addition product by (a) stripping of the volatile solvent at reduced pressure or (b) by crystallization and filtration where the solid nature of the product permits. Fractional distillation, fractional crystallization or precipitation can be used for further purification of the more tractable $N^2$-carbamoyl-$N^1,N^1,N^3,N^3$-tetrasubstituted guanidines.

In this specification, the term "carbamoyl" is used (in conjunction with a monovalent organic radical) to define the structure

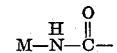

wherein M is the parent monovalent organic radical, of a corresponding isocyanate compound, thus ethylcarbamoyl describes

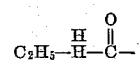

wherein M is ethyl, the parent radical of the corresponding ethyl isocyanate.

The preferred compounds of this invention can be described as those in which the monovalent organic radical R in Formula 1 can be a $C_1$-$C_{12}$ hydrocarbyl or substituted hydrocarbyl group, such as (a) alkyl and cycloalkyl groups, methyl, ethyl, propyl, butyl, amyl, hexyl, octyl, decyl and dodecyl, cyclopentyl, cyclohexyl and p-menthyl; (b) aryl groups, such as phenyl, tolyl, xylxl, naphthyl, biphenyl; or (c) aryl groups substituted with one or more nitro, chloro, bromo, $C_1$-$C_5$ alkyl or $C_1$-$C_5$ alkoxy groups. Further, R can be (d) a $C_3$-$C_{12}$ alkenyl group, such as allyl, butenyl, hexenyl, heptenyl, octenyl, decenyl, undecenyl or dodecenyl; or (e) a carbalkoxyalkyl group, such as carbomethoxymethyl, carbethoxymethyl, carbopropoxymethyl, carbobutoxymethyl, carbethoxyethyl, carbethoxybutyl, carbethoxyamyl and similar $C_2$-$C_5$ carbalkoxy substituted $C_1$-$C_5$ alkyl groups. R also can be (f) a substituted alkyl group, such as methoxyethyl, methoxymethyl, methoxypropyl, methoxybutyl, methoxyamyl, methoxyethyl, ethoxyethyl, butoxyethyl, butoxybutyl and related $C_1$-$C_4$ alkoxy-$C_1$-$C_{10}$ alkyl groups; (g) an aryl, such as β-phenylethyl, α-phenylpropyl, benzyl; or (h) a chloroalkyl group, such as β-chloroethyl, chloropropyl, β-dichlorethyl, chlorobutyl.

The preferred $R^1$ radicals of this invention are the polyvalent $C_4$-$C_{10}$ alkylene, $C_6$-$C_{12}$ cycloalkylene and $C_6$-$C_{20}$ arylene, $C_7$-$C_{20}$ alkarylene radicals, such as:

tetramethylene
pentamethylene
hexamethylene
octamethylene
nonamethylene
decamethylene
cyclohexylene
methylcyclohexylene
methylene
methylene-bis-cyclohexylene-4
o, m, and p-phenylenes
tolylene
xylylene
cuminylene
methylene-bis-(phenylene)
methylene-bis-(tolylene)
methylene-bis-(3-chlorophenylene)
1,5-naphthylene
4,4'-diphenylene
4-chlorophenylene-1,3
5-chlorotolylene-2,4
3,5-dichlorotolylene-2,4
2,4,6-tolylene
methylene-tris-phenylene
oxydiphenylene-2,4,4'

Polymethylene-polyphenylene and other related polyfunctional radicals classed as $C_{13}$–$C_{50}$ polyalkylene-polyarylene can be used. Some are derived, for example, by the removal of the residual isocyanate groups from the adducts of diisocyanates and polyols, for example, the trivalent radicals formed by removal of three isocyanate groups from the adduct of three mols of tolylene diisocyanate with one mol of trimethylol ethane ($C_{26}$) or trimethylol propane ($C_{27}$).

The preferred $R^a$, $R^b$, $R^c$ and $R^d$ groups on the guanidine (G) radical are monovalent radicals free from groups reactive with isocyanate groups and aromatic unsaturation and can be the same or different from each other and can be the same as R as previously set forth. Thus, each can be selected from the class of groups defined previously under the symbol R which includes:

$C_1$–$C_{12}$ alkyl
$C_1$–$C_4$ alkoxy-$C_1$–$C_{10}$ alkyl
$C_3$–$C_{12}$ alkenyl
$C_2$–$C_5$ carbalkoxy-$C_1$–$C_5$ alkyl
$C_6$–$C_{10}$ cycloaliphatic Particularly preferred for the simplicity of the manufacture of their derivatives are the $C_1$–$C_{10}$ alkyl groups and the $C_3$–$C_{10}$ alkenyl groups. Where $R^a$ is combined with $R^b$, and $R^c$ is combined with $R^d$, these become in effect divalent groups forming with the $N^1$ and the $N^3$ atoms respectively a heterocyclic ring. Thus, $R^a/R^b$ and $R^c/R^d$ can be $C_2$–$C_6$ polymethylene, oxydiethylene and iminodiethylene groups forming such well known non-aromatic N-heterocyclic radicals with the free valence at the nitrogen atom as:

pyrrolidino-
piperidino-
morpholino-
N'-alkylpiperazino-
azepano-
azepeno-

It is by virtue of these $N^1$ and $N^3$ heterocyclic substituents that an alternative nomenclature for this class of guanidines is preferred herein, that is, the 1,1'-(substituted amino) methyleneimines.

The B group of the above structural Formula 2, though preferably hydrogen, can also be isocyanate. Isocyanate-bearing compounds of this invention permit the incorporation of the guanidine structure directly into polymers. Thus, the reaction product, for example, of one mole of a tetramethylguanidine (hereinafter abbreviated as TMG) with one mole of toluene diisocyanate or with toluene triisocyanate can in turn be used in combination with other diamines, polyols, polyesters, polyethers and diisocyanates to prepare either terminal or chain segments of N-guanidinourethane polymers.

The following examples further illustrate the compounds of this invention.

*Example I*

A solution of 10.4 parts of TMG dissolved in 35.5 parts of anhydrous diethyl ether is added slowly to a solution of 10 parts of α,α-dimethylallyl isocyanate dissolved in 71 parts of anhydrous diethyl ether in a vessel equipped for addition stirring, heating, vacuum distillation and refluxing. The addition is done over a period of an hour, cooling when necessary to avoid excessive reflux, and then the mixture is slowly refluxed at about 35° C. for another three hours. The ether is stripped off at reduced pressure. A clear, colorless, viscous residue remains, identified as the adduct:

$N^2$(α,α-dimethylallyl)carbamoyl-$N^1,N^1,N^3,N^3$-tetramethylguanidine.

Calc.: 58.37% C, 9.80% H, 24.76% N. Found: 58.21% C, 9.56% H, 24.56% N.

A 10% by weight solution of the above compound is made in toluene and 0.2 ml. of the solution is thoroughly dispersed in 10 grams of a vinyl dioxolane-based red lead primer (described in detail in Example XVIII). Films 5–6 mils thick, coated on Bonderited steel panels with a 10 mil doctor knife, are found to air dry to a tack-free film in about 4 hours. The same coating without the guanidine adduct used as a control, is found to require more than 8 hours under similar conditions to air dry to a tack-free state.

*Example II*

Using the equipment of Example I, a solution of 57.5 parts (0.5 mol) of TMG in 210 parts of diethyl ether is placed in the vessel. To this is slowly added over a period of two hours, with some cooling to control the exothermic reflux, 65.5 parts (0.55 mol) of phenyl isocyanate dissolved in 35.5 parts of anhydrous diethyl ether. Stirring is continued for another two hours at 30° C. and the white crystalline solid filtered, washed with fresh ether and dried under nitrogen. A melting point of 102–103° C. is determined and the product identified as:

$N^2$-phenylcarbamoyl-$N^1,N^1,N^3,N^3$-tetramethylguanidine

*Example III*

Using the equipment and procedure of Example II, 97.5 parts (0.50 mol) of o-biphenyl isocyanate dissolved in 70 parts of ether is added to 57.5 parts (0.50 mol) of TMG dissolved in 210 parts of ether. A white crystalline solid, M.P. 36°–39° C., is recrystallized from a benzene cyclohexanone mixture and is identified as:

$N^2$-o-biphenylcarbamoyl-$N^1,N^1,N^3,N^3$-tetramethylguanidine.

*Example IV*

Example III is repeated, substituting 99 parts (0.5 mol) of 4-bromophenyl isocyanate for the o-biphenyl isocyanate. A white crystalline adduct is prepared having a M.P. of 153°–155° C., identified by infrared spectra and elemental analysis as:

$N^2$-(4-bromophenylcarbamoyl)-$N^1,N^1,N^3,N^3$-tetramethylquanidine.

In an analogous fashion, other substituted isocyanates can be reacted in this procedure to yield analogous adducts respectively, for example:

$N^2$-(o-chlorophenylcarbamoyl)-$N^1,N^1,N^3,N^3$-tetramethylguanidine.
$N^2$-(m-iodophenylcarbamoyl)-$N^1,N^1,N^3,N^3$-tetramethylguandine
$N^2$-(p-trifluoromethylcarbamoyl)-$N^1,N^1,N^3,N^3$-tetramethylguanidine
$N^2$-(β-chloroethylcarbamoyl)-$N^1,N^1,N^3,N^3$-tetramethylguanidine
$N^2$-(p-hexylphenylcarbamoyl)-$N^1,N^1,N^3,N^3$-tetramethylguanidine
$N^2$-(3,3-dinitrobutylcarbamoyl)-$N^1,N^1,N^3,N^3$-tetramethylguanidine
$N^2$-(3-cyclohexylcarbamoyl)-$N^1,N^1,N^3,N^3$-tetramethylguanidine

*Example V*

Example III is repeated, substituting 82 parts (0.50 mol) of p-nitrophenyl isocyanate for the o-biphenyl isocyanate. A yellow crystalline product, suitable as an acid acceptor, results, melting at 128°–129° C. and identified by infrared analysis as:

$N^2$-(p-nitrophenylcarbamoyl)-$N^1,N^1,N^3,N^3$-tetramethylguanidine

*Example VI*

Using the procedure of Example II, 25 parts (0.194 mol) of ethyl isocyanatoacetate dissolved in 105 parts of ether are added to 9.8 parts (0.194 mol) of TMG dissolved in 140 parts of ether. After the reaction is complete, the ether is removed under reduced pressure to leave a yellow gummy residue which crystallizes on standing. It is identified by infrared analysis as:

$N^2$-(carbethoxymethylcarbamoyl)-$N^1,N^1,N^3,N^3$-tetramethylguanidine

*Example VII*

Using the procedure of Example II, 14.2 parts of ethyl isocyanate dissolved in 71 parts of anhydrous ether are added slowly to 39 parts of 1,1-dipyrrolidinomethyleneimine dissolved in 71 parts of ether. A white crystalline product is recovered having a melting point of 74°–75° C., identified by infrared and elemental analysis as:

$N^2$-(ethylcarbamoyl)-1,1-dipyrrolidinomethyleneimine

Calc.: 60.47% C, 9.31% H, 23.51% N. Found: 60.21% C. 9.42% H, 22.77% N.

*Example VIII*

Using the equipment and procedure of Example II, 10.7 parts of ethyl isocyanate (0.15 mol) dissolved in 35 parts of diethyl ether are added slowly to and reacted with 29.8 parts (0.15 mol) of dimorpholinomethyleneimine. A white crystalline solid is filtered from the ether and recrystallized from acetone to yield a product having a melting point of 137°–138° C. and identified by infrared analysis as:

$N^2$-(ethylcarbamoyl)-1,1-dimorpholinomethyleneimine

Calc.: 53.31% C, 8.20% H, 20.73% N. Found: 53.60% C, 8.18% H, 20.89% N.

*Example IX*

Using the procedure of Example III, 11.9 parts (0.1 mol) of phenyl isocyanate are added dropwise, with stirring, to 22.3 parts (0.1 mol) of diazepanomethyleneimine dissolved in 37 parts of diethyl ether. A white crystalline product slowly forms and is identified by infrared and elemental analysis as the adduct (with a melting point of 108°–110° C.):

$N^2$-(phenylcarbamoyl)-1,1-diazepanomethyleneimine

Calc.: 70.2% C, 8.8% H, 16.4% N. Found: 70.6% C, 9.00% H, 16.05% N.

*Example X*

Using the equipment of Example I, 29.6 parts (0.15 mol) of undecyl isocyanate are added slowly to 29.8 parts of dimorpholinomethyleneimine in 160 parts of benzene. The reaction exotherm raises the temperature to about 50° C. which is maintained at reflux thereafter by external heating for about 15 hours. The solution is then cooled, the crystalline product filtered off and dried under nitrogen. It has a melting point of 127°–128° C. and is identified by infrared and elemental analysis as:

$N^2$-(undecylcarbamoyl)-1,1-dimorpholinomethyleneimine

Calc.: 63.60% C, 10.17% H, 14.13% N. Found: 63.66% C, 10.58% H, 14.70% N.

*Example XI*

A quantity of the unsymmetrical guandine, 1-diallylamino-1-piperidinomethyleneimine, is prepared by the reaction of piperidine with diallyl cyanamide according to S. Birtwell, Journal Chemical Society, 1946, p. 491, and German Patent 1,795,738.

Using the equipment of Example X, 918 parts of the above imine is added slowly to 3.4 parts (0.048 mol) of ethyl isocyanate dissolved in 44 parts of benzene. An exotherm of 50° C. develops and the reaction mixture is refluxed for about 5 hours. The benzene is then stripped off at reduced pressure, leaving a viscous yellow residue product. This is identified by infrared and elemental analysis as:

$N^2$-(ethylcarbamoyl)-1-diallylamino-1-piperidinomethyleneimine

Calc.: 64.71% C, 9.41% H, 21.13% N. Found: 64.79% C, 9.21% H, 19.72% N.

Analogous N-(substituted carbamoyl)-1-diallylamino-1-piperidinomethyleneimine products from the appropriate isocyanates can also be made by the procedures of Examples X and XI in which the $N^2$-(substituted carbamoyl) group is:

N-(methylcarbamoyl)
N-(n-octylcarbamoyl)
N-(ethoxyethylcarbamoyl)
N-(butoxybutylcarbamoyl)
N-(cyclohexylcarbamoyl)
N-(allylcarbamoyl)
N-(m-tolylcarbamoyl)
N-(p-ethoxyphenylcarbamoyl)
N-(3,4-dichlorophenylcarbamoyl)
N-(o-methoxyphenylcarbamoyl)
N-(m-nitrophenylcarbamoyl)
N-(benzylcarbamoyl)

*Example XII*

Using the procedure of Example XI, 46.0 parts (0.4 mol) of TMG dissolved in 45 parts of benzene are added slowly to and reacted with 72.0 parts (0.4 mol) of 9-decenylisocyanate in 165 parts of benzene. Heating is continued after the exotherm for about 5 hours, the benzene stripped off at reduced pressure and the remaining liquid fractionated at about 110° C. at 0.45 mm. Hg. The product is identified by infrared and elemental analysis as:

$N^2$-(9-decenylcarbamoyl)-$N^1,N^1,N^3,N^3$-tetramethylguanidine.

Calc.: 64.82% C, 10.88% H, 18.90% N. Found: 64.63% C, 11.35% H, 18.40% N.

*Example XIII*

Using the equipment similar to that of Example I, 50.0 parts (0.2 mol) of freshly distilled methylene-bis-4-phenylisocyanate suspended in 210 parts of anhydrous ethyl ether are placed in the vessel and, under a blanket of nitrogen, 46.0 parts of TMG (0.4 mol) in 70 parts of ether are added dropwise, with rapid stirring. A white precipitate forms immediately, which after 2 hours of stirring at 30°–33° C., is filtered off and washed with fresh ether. A melting point of 115°–120° C. is found and the product identified by its infrared spectra as:

$N^2,N^{2'}$-(methylene-di-p-phenylenedicarbamoyl)-bis-(tetramethylguanidine).

*Example XIV*

In the equipment of Example I are placed 50 parts (0.298 mol) of hexamethylene diisocyanate dissolved in about 240 parts of tetrahydrofuran. A solution of 68.5 parts (0.596 mol) of TMG in 100 parts of tetrahydrofuran is added slowly, the temperature rises to 55° C., and the mass is then further reacted for about 2 hours at reflux (65° C.). The tetrahydrofuran is stripped off at reduced pressure and a clear viscous liquid remains which crystallizes on standing. A molecular weight of 384 is determined (calculated 399) and the product is identified by its infrared spectra as:

$N^2,N^{2'}$-(hexamethylenedicarbamoyl)-bis-(tetramethylguanidine).

In a similar manner, by use of other diisocyanates in place of the hexamethylene diisocyanate, analogous carbamoyl-bis-guanidines can be prepared, for example:

$N^2,N^{2'}$-(phenylene-1,3-dicarbamoyl)-bis-(tetramethylguanidine)

N²,N²′-(tolylene-2,4-dicarbamoyl)-bis-
    (tetramethylguanidine)
N²,N²′-(m-xylylene-dicarbamoyl)-bis-(tetramethyl-
    guanidine)
N²,N²′-(pentamethylene-dicarbamoyl)-bis-
    (tetramethylguanidine)
N²,N²′-(decamethylene-dicarbamoyl)-bis-
    (tetramethylguanidine)
N²,N²′-(tetramethylene-dicarbamoyl)-bis-
    (tetramethylguanidine)
N²,N²′-(methylene-dicyclohexylene-dicarbamoyl)-bis-
    (tetramethylguanidine)
N²,N²′-(sulfonyl-di-p-phenylene-dicarbamoyl)-bis-
    (tetramethylguanidine)
N²,N²′-(oxydi-p-phenylene-dicarbamoyl)-bis-
    (tetramethylguanidine)
N²,N²′-(3,3′-dimethoxy-4,4′-biphenylene-dicarbamoyl)-
    bis-(tetramethylguanidine)
N²,N²′,N²″-(methylidyne-4,4′4″-triphenylene-tricarbam-
    oyl)-tris-(tetramethylguanidine)
N²,N²′-(4-phenoxyphenyl-1,2-dicarbamoyl)-bis-
    (tetramethylguanidine)

Similarly, other tetrasubstituted guanidines than TMG can be used.

*Example XV*

Using the procedure of Example XIV, 39 parts of polymethylene-polyphenyl isocyanate (a product of Carium Company, designated PAPI) having an average molecular weight of 390 are reacted with 46 parts of TMG in 200 parts of benzene. A clear resinous product results after stripping solvent and unreacted TMG at 0.1 mm. (50° C.), which is the polytetramethylguanidine adduct of polymethylene-polyphenyl isocyanate. Variations in proportions of ingredients produce products having some or no residual isocyanate groups.

*Example XVI*

Using the equipment of Example III, 50 parts (0.335 mol) of p-methoxyphenyl isocyanate dissolved in 70 parts of ether is reacted with 78.6 parts (0.355 mol) of TMG in 215 parts of ether. The mixture is allowed to stand for 24 hours at 25° C., is refluxed 2 hours, then the ether stripped off at 25° C. and 10 mm. Hg. The residual liquid is fractionated at 133° C. at 0.1 mm. Hg to yield a colorless product identified as:

N²-(p-methoxyphenylcarbamoyl)-N¹,N¹,N³,N³-
    tetramethylguanidine.

*Example XVII*

Using the procedure of Example X, an analogous compound is made by reacting 25 parts (0.194 mol) of carbethoxymethylisocyanate (ethyl isocyanatoacetate) with 37.8 parts (0.194 mol) of 1,1-dimorpholinomethyleneimine in 180 parts of benzene. The mixture is refluxed for 3 hours, then stripped at 40° C., 10 mm. Hg. The resulting yellow, glassy solid product is identified by elemental analysis as:

N²-(carbethoxymethylcarbamoyl)-1,1-dimorpholino-
    methyleneimine.

Similarly, an N²-(carbobutoxybutylcarbamoyl)-1,1-dimorpholinomethyleneimine is prepared by replacing the isocyanate above with an equimolar amount of carbobutoxybutyl isocyanate (butyl isocyanatobutyrate).

*Example XVIII*

The relative activity of the carbamoyl guanidines of this invention as accelerators for air drying compositions is determined as follows:

An air drying coating composition is prepared by dispersing 18.45 lbs. of red lead oxide pigment and 43.35 lbs. of iron oxide ($Fe_2O_3$) pigment in 32.9 lbs. of a vehicle consisting of: 50 parts orthophthalate-bis-ester of 2-vinyl-1,3-dioxolane butanol; 50 parts itaconate-bis-ester of 2-vinyl-1,3-dioxolane butanol. To this is added and dispersed .06 lb. cobalt metal (as a 10% cobalt butyl phthalate solution in toluene).

Separate test compositions are then prepared by mixing into 10 gram samples of the above composition, 0.2 mol of a 10% by weight solution (in toluene) of the accelerator to be tested yielding about a 0.2% level of accelerator on the total paint composition.

The well-mixed sample is then coated on glass and/or Bonderited steel panels with a 10 mil doctor blade to give a dry film thickness of 5–6 mils. Dry time is then measured by the Zapon tack tester (see U.S. 2,406,989 for detailed description) against the dry time of a control panel coated with the same composition containing no accelerator.

The following summarizes the drying rates of typical accelerators in Examples I–XIV, XVI, XVII and XIX, thus determined:

| Example | Dry Time, Hours | Dry Time of Control |
|---|---|---|
| I | 3½ | 7 |
| II | 3½ | 7 |
| III | 5 | 7 |
| IV | 5 | 7 |
| V | 7 | 7 |
| VI | 7 | 8 |
| VII | 4 | 6½ |
| VIII | 5 | 6½ |
| IX | 3¾ | 5½ |
| X | 4½ | 7 |
| XI | 5 | 7 |
| XII | 5 | 8 |
| XIII | 6¼ | 7 |
| XIV | 4¾ | 6½ |
| XVI | 5 | 5½ |
| XVII | 5 | 7 |
| XIX | 4¼ | 7 |

It should be noted that a sample of N²-(p-phenylcarbamoyl)-N¹,N³-dimethylguanidine, which is thus not a tetrasubstituted guanidine and not a compound of this invention, when used as above is found not to be an accelerator. It should be noted that the variation in dry time of the control coatings was due to variations in temperature and humidity of the different days on which the tests were run.

*Example XIX*

The condensation product of 1 mol of toluene diisocyanate and 1 mol of β-hydroxyethyl methacrylate, i.e., methacryloxyethyl - 3 - isocyanato - 4 - methyl-phenylcarbamate, is prepared by conventional procedure. A solution of 47 parts (0.162 mol) of this product is dissolved in 180 parts of benzene in a nitrogen blanketed vessel and 18.7 parts (0.162 mol) of TMG are added slowly with stirring, holding the temperature between 0–20° C. After 24 hours the benzene is stripped at 1 mm. Hg to leave a very viscous, clear liquid identified as:

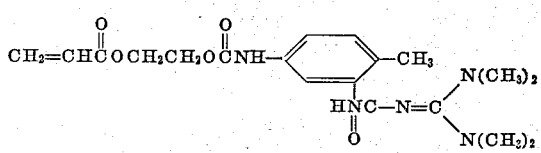

In the preparation of the compounds of this invention, such inert solvents as ethers, aliphatic or aromatic hydrocarbons, chlorinated hydrocarbons, dimethyl formamide, etc., can be used, the solvent being selected as having the best combination of (a) solvency for the raw materials, (b) boiling point range for reflux suitable for the most efficient reaction rate, and (c) ease of removal of the solvent from the addition product. In general, raw materials are proportioned on molar ratios equivalent to their isocyanate content, however, other ratios can be used, i.e., for those compounds intended to be incorporated in urethane polymers. Where the addition product is a crystallizable solid, filtration and washing can be used to recover it. Some of the products, though solids, crystallize reluctantly and their recovery is best effected by stripping of the residual solvent under reduced pressure in an inert atmosphere.

*Example XX*

A solution of 18.8 parts (0.1 mol) of 3,4-dichlorophenylisocyanate in 180 parts of toluene was stirred in a closed container, fitted for reflux and 11.5 parts (0.1 mol) of TMG were added over a period of about 12 minutes. The temperature rose from about 21° C. to 38° C. and as stirring was continued, a solid began to form and the temperature was then raised to 47° C. for an hour and then the reaction refluxed for 3 hours. The toluene was then stripped off under vacuum to leave a viscous oil identified as:

$N^2$-(3,4-dichlorophenylcarbomoyl)-$N^1,N^1,N^3,N^3$-tetramethylguanidine.

I claim:

1. A coating composition comprising a 2-vinyl cyclic acetal compound polymerizable in air, a siccative metal salt and from 0.001% to 5.0% of at least one $N^2$-carbamoyl-$N^1,N^1,N^3,N^3$-tetrasubstituted guanidine selected from the class represented by the following structures:

and

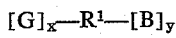

in which:

$x$ is an integer from 1 to 6;
$y$ is an integer from 0 to 6—$x$;

G is an ($N^1,N^1,N^3,N^3$-tetrasubstituted guanidine-$N^2$) carboxamido radical having the following structure:

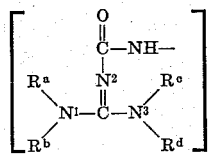

wherein:

$R^a$, $R^b$, $R^c$ and $R^d$ are selected from the class consisting of (1) monovalent hydrocarbyl, (2) substituted hydrocarbyl radicals free of groups reactive with isocyanate and free of aromatic unsaturation, and (3) when $R^a$ combined with $R^b$, and $R^c$ combined with $R^d$, they are divalent alkylene, alkenylene and oxyalklene radicals;

R is a monovalent organic radical having 1 to 12 carbon atoms and free of isocyanate reactive groups;

$R^1$ is a polyvalent organic radical having a valence equal to $x+y$ and free of isocyanate reactive groups;

B is hydrogen or an isocyanate radical.

2. A composition of claim 1 in which the guanidine is: $N^2$-(phenylcarbamoyl)-$N^1,N^1,N^3,N^3$-tetramethylguanidine.

3. A composition of claim 1 in which the guanidine is: N-(ethylcarbamoyl)-1,1-dipyrrolidinomethyleneimine.

4. A composition of claim 1 in which the guanidine is: N-(ethylcarbamoyl)-1,1-dimorpholinomethyleneimine.

5. A composition of claim 1 in which the guanidine is: N-(phenylcarbamoyl)-1,1-diazepanomethyleneimine.

No references cited.

MORRIS LIEBMAN, *Primary Examiner.*

A. LIEBERMAN, *Assistant Examiner.*